(12) United States Patent
Hjeldnes (10) Patent No.: US 7,628,172 B2
(45) Date of Patent: Dec. 8, 2009

(54) HOSE CONNECTION DEVICE (75) Inventor: Finn Hjeldnes, Eidsnes (NO)

(73) Assignee: Odim ASA, Hareid (NO)

( * ) Notice: Subject to any disclaimer, the term of this patent is extended or adjusted under 35 U.S.C. 154(b) by 0 days.

(21) Appl. No.: 11/660,763

(22) PCT Filed: Aug. 24, 2005

(86) PCT No.: PCT/NO2005/000308

§ 371 (c)(1),
(2), (4) Date: Jul. 31, 2007

(87) PCT Pub. No.: WO2006/022556

PCT Pub. Date: Mar. 2, 2006

(65) Prior Publication Data

US 2008/0006335 A1    Jan. 10, 2008

(30) Foreign Application Priority Data

Aug. 24, 2004    (NO) .................................. 20043526

(51) Int. Cl.
*F16L 37/28* (2006.01)
(52) U.S. Cl. .............................. 137/614.04; 137/614.03
(58) Field of Classification Search ............ 137/614.03, 137/614.04, 614.05
See application file for complete search history.

(56) References Cited

U.S. PATENT DOCUMENTS

| 4,543,992 | A |   | 10/1985 | Palmer |           |
|-----------|---|---|---------|--------|-----------|
| 5,123,446 | A | * | 6/1992  | Haunhorst et al. | 137/614.02 |
| 5,709,243 | A | * | 1/1998  | Wells et al.     | 137/614.03 |
| 5,934,319 | A |   | 8/1999  | Schumacher |     |
| 6,158,717 | A | * | 12/2000 | Van Scyoc et al. | 137/614.03 |

FOREIGN PATENT DOCUMENTS

| DE | 43 23 758 A1    | 4/1994  |
|----|-----------------|---------|
| FR | 1 595 442 A     | 6/1970  |
| WO | WO-97/06089 A1  | 2/1997  |
| WO | WO-97/09513 A1  | 3/1997  |
| WO | WO-00/02773 A1  | 1/2000  |
| WO | WO-02/098726 A1 | 12/2002 |

* cited by examiner

*Primary Examiner*—Kevin L Lee
(74) *Attorney, Agent, or Firm*—Birch, Stewart, Kolasch & Birch, LLP (57) ABSTRACT

A method and device for temporarily coupling of a hose to a pipe system, where a first coupling part is connected to the hose, and a second coupling part is connected to the pipe system, where both the first and second coupling part comprises valves that automatically closes when said first and second coupling parts are not connected to each other, wherein said first and second coupling part are brought into interaction with each other to establish a tight connection before the valves in the coupling parts are opened and where the coupling parts are locked to each other.

8 Claims, 8 Drawing Sheets

HOSE CONNECTION DEVICE

THE FIELD OF THE INVENTION

The present invention relates to transfer and connection operations of hoses, more specifically bulk hoses for use between an offshore supply vessel and an offshore drilling-/operating rig or a vessel and an offshore drilling/operating platform. Most specifically, the invention relates to a method of connection of a hose to pipe system and a hose connector.

BACKGROUND OF THE INVENTION

Bulk, dry or liquid, to an offshore drilling-/operating rig or a vessel and an offshore drilling-/operathig platform, on the following commonly referred to as a platform, is mostly transported on dedicated storage tanks onboard supply ships. From the storage tanks onboard the supply vessel, the bulk is pumped and transferred from the supply vessel to the platform in a bunker hose system. A hose for transfer of the bulk is normally stored onboard the platform on hose wheels and is transferred and connected to the supply vessel by means of cranes or the like. The hose may, however, be stored onboard the supply vessel.

The supply vessel has a series of hose couplings at the cargo rail, identically on port and starboard side of the ship. Transfer and connection of hoses from a platform to a supply vessel is today a manual operation that includes heavy manual work in the handling of the hose. Additionally, situations that may cause damage to personnel and/or equipment may occur due to the relative movement between the platform and the vessel.

The manual work includes coupling of a female coupling part provided at the end of the hose, to a male coupling part placed on or in the cargo rail of the vessel. After coupling of the male and female parts, valves in the male and/or female parts may be manually opened and the transfer of the bulk may be started.

When the hose is to be disconnected, the valves in the male and/or female parts have to be closed manually before the coupling may be decoupled and the hose disconnected from the vessel. In emergency situation the hose may have to be disconnected rapidly to be able to remove the vessel from the platform. In such situations, the manual work involved in the operation, makes it difficult or even impossible to disconnect the hose from the vessel without damage to personnel or equipment.

Accordingly it is an objective of the present invention to provide for solutions that minimizes the need for manual handling during transfer and connection of the hose and the decoupling and disconnection of the same to reduce potential damage to personnel and equipment.

Additionally, a known problem with known hose connections is the potential loss of environmentally hazardous material during operation. Another object of the invention is therefore to provide for a solution that reduces or eliminates the loss of bulk material during operation and coupling. The solution provided should be efficient in operation and handling of the hose and provide for a closure when the hose is de-connected.

The general design philosophy of the system equipment shall be based on safety of personnel and minimum or no pollution of the environment, equipment simplicity, efficient operating and handling of the hoses (state of the art design and operating philosophy). Additionally requirements shall give easy access to inspection, maintenance and replacement of parts if required.

SUMMARY OF THE INVENTION

According to a first aspect, the present invention relates method for temporarily coupling of a hose to a pipe system, where a first coupling part is connected to the hose, and a second coupling part is connected to the pipe system, where both the first and the second coupling part comprises valves that automatically closes when said first and second coupling parts are not connected to each other, wherein said first and second coupling part are brought into interaction with each other to establish a tight connection before the valves in the coupling parts are opened and where the coupling parts are locked to each other.

According to an embodiment, the valves are opened by interaction of the valve parts of the first coupling part and the valve parts of the second coupling part.

According to a second aspect, the present invention relates to a hose connection device for temporarily coupling of a hose to a pipe system, the connection device comprising a first coupling part connected to the hose, and a second coupling part connected to the pipe system, where both coupling parts comprises valves that are automatically closed when the coupling parts are not connected to each other, wherein a part of one of the coupling parts is designed to be inserted into the other coupling part to form a tight connection, and where the parts of the valves in the coupling parts are designed to interact with each other to open both valves after the tight connection is formed. The tight connection formed before the opening of the valves ensures that there is no leakage of bulk from neither the hose nor the pipe system. Preferably, the parts are designed to an exact fit, to avoid that remaining bulk material is spilled during coupling and de-coupling of the device.

According to a first embodiment, the first coupling part comprising a tubular main body having a connection branch for connection to a hose in one end and a connection part for connection to the second coupling part, in the other end, wherein a check valve is formed by a mainly axially displaceable valve cone is designed to interact with a conical valve seat formed in the inner wall of the main body close to connection part, where both cones have their smallest diameter closest to the connection part.

Preferably the valve cone is forced against the valve seat. In the described embodiment, an helical spring is used to force the cone against the valve seat. Any alternative elastic solutions are useful.

According to a second embodiment, the second coupling part comprises a mainly cylindrical part designed to be partly inserted into the connection part of the first coupling part and to form a tight connection with said connection part.

According to a third embodiment, the second coupling part comprises an axially displaceable and mainly tubular valve seat member, designed to interact with a valve cone on an mainly axially arranged bolt.

The valve seat member may be designed to interact and form a tight connection with the connecting part of the first coupling part, where the valve seat member is designed to open the valve in the second coupling part, and that the bolt is designed to interact with the valve cone to open the valve in the first coupling part as the connection parts are forced together.

According to the described embodiment, said first coupling part may be described as a "female" coupling part, and said second coupling part may be described as a "male" coupling part. The male and female coupling parts may, however, change place without leaving the scope of the invention.

In the following the denominations "female" and "male" are mainly used represent the first and second coupling parts, respectively.

DETAILED DESCRIPTION OF THE INVENTION

When a hose is to be connected to the system of the supply vessel, the hose is lowered from the platform by means of a crane or the like to the supply vessel. A female coupling part 100 is fastened to the end of the hose. A forerunner having a ball at its end is connected to the female coupling part 100.

Figure 1:
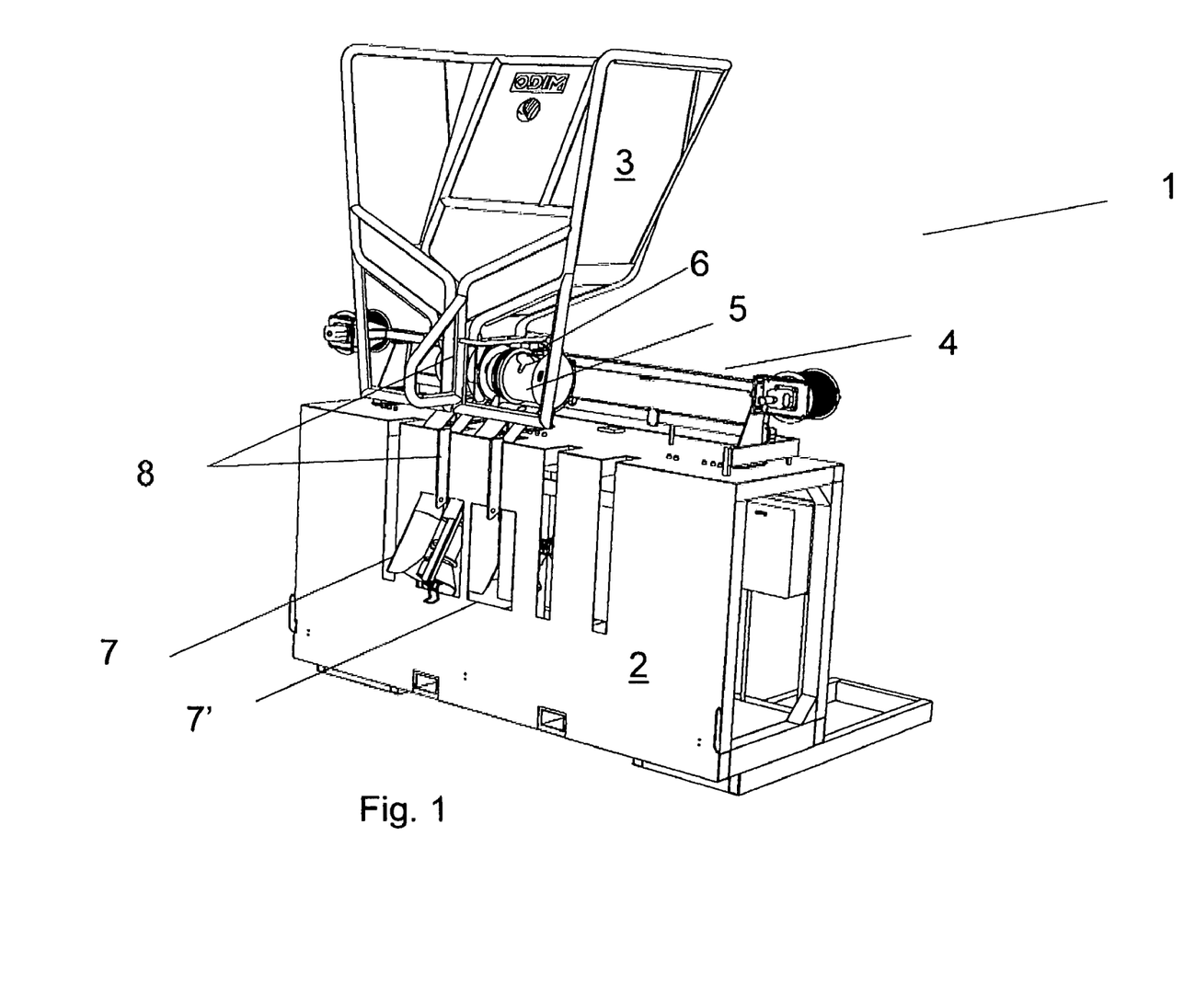
FIG. 1 is a principle drawing illustrating the overall hose connection system.

FIG. 1 is an illustration of a part of cargo rail 2 of a supply vessel wherein a hose handling system 1 is integrated. The hose handling system comprises a funnel shaped catcher 3 movably arranged at the cargo rail 2. The catcher 3 may be moved along a part of the cargo rail by means of a transport device 4. When a hose to be connected is lowered the ball of the forerunner is received by the catcher 3 that is located above a drum 5. The ball is guided by means of the funnel to the drum where it is received into a recess 6 in the drum surface. The hose is thereafter lowered so that the female coupling part is located lower than a row of receiving hatches 7 in the cargo rail. The forerunner is in this situation connected to the drum and is guided by the funnel into an outwardly positioned longitudinal opening 8 running from the funnel, through a part of the cargo rail and the receiving hatch to allow the forerunner to form a substantially straight line from the female coupling part to the drum. In this position the drum is activated and pulls the female coupling part into the receiving hatch 7.

Figure 2:
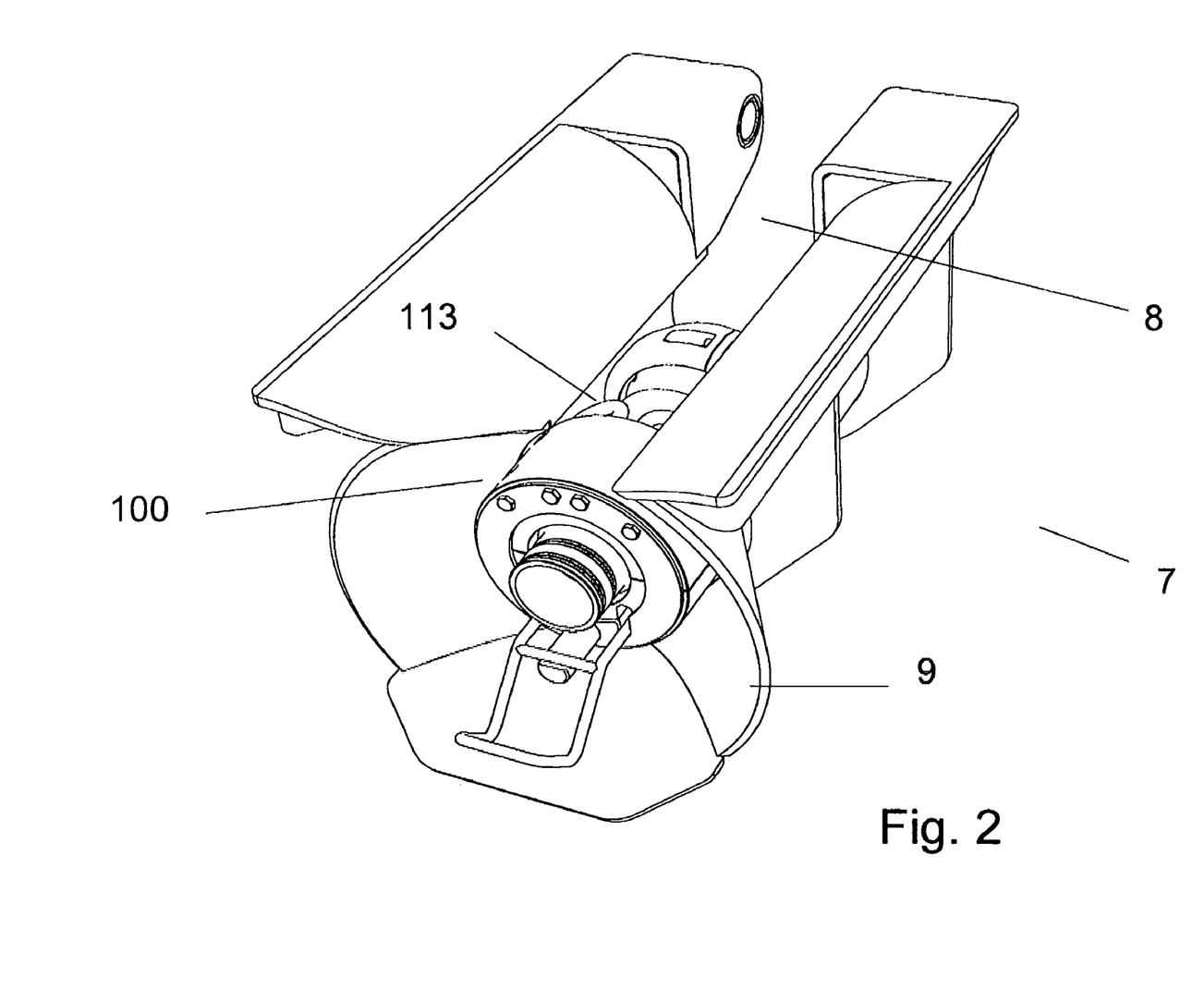
FIG. 2 is a birds view of a receiving hatch and a female coupling part.
Figure 3:
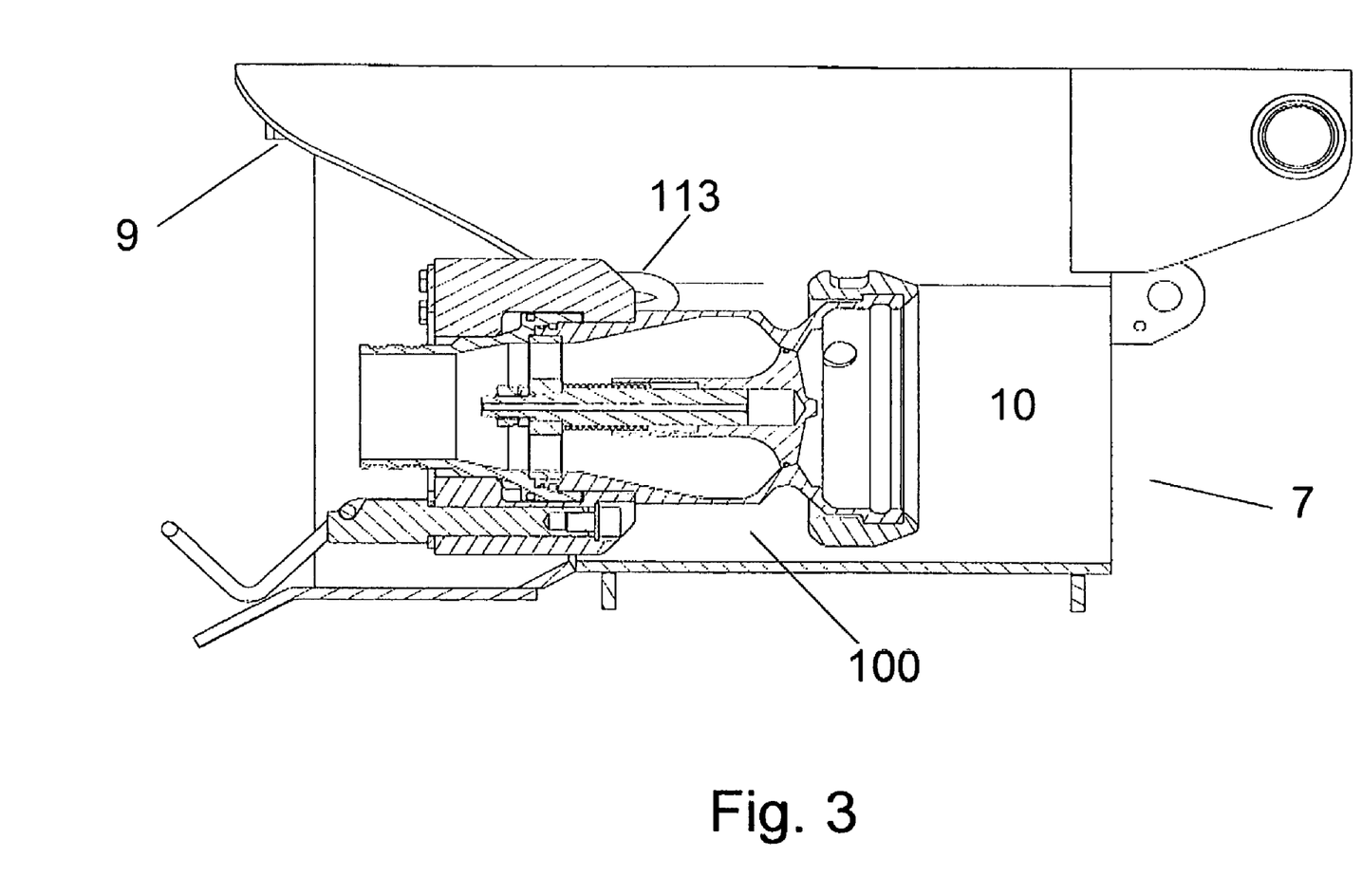
FIG. 3 is a longitudinal section of a receiving hatch and a female coupling part.
Figure 4:
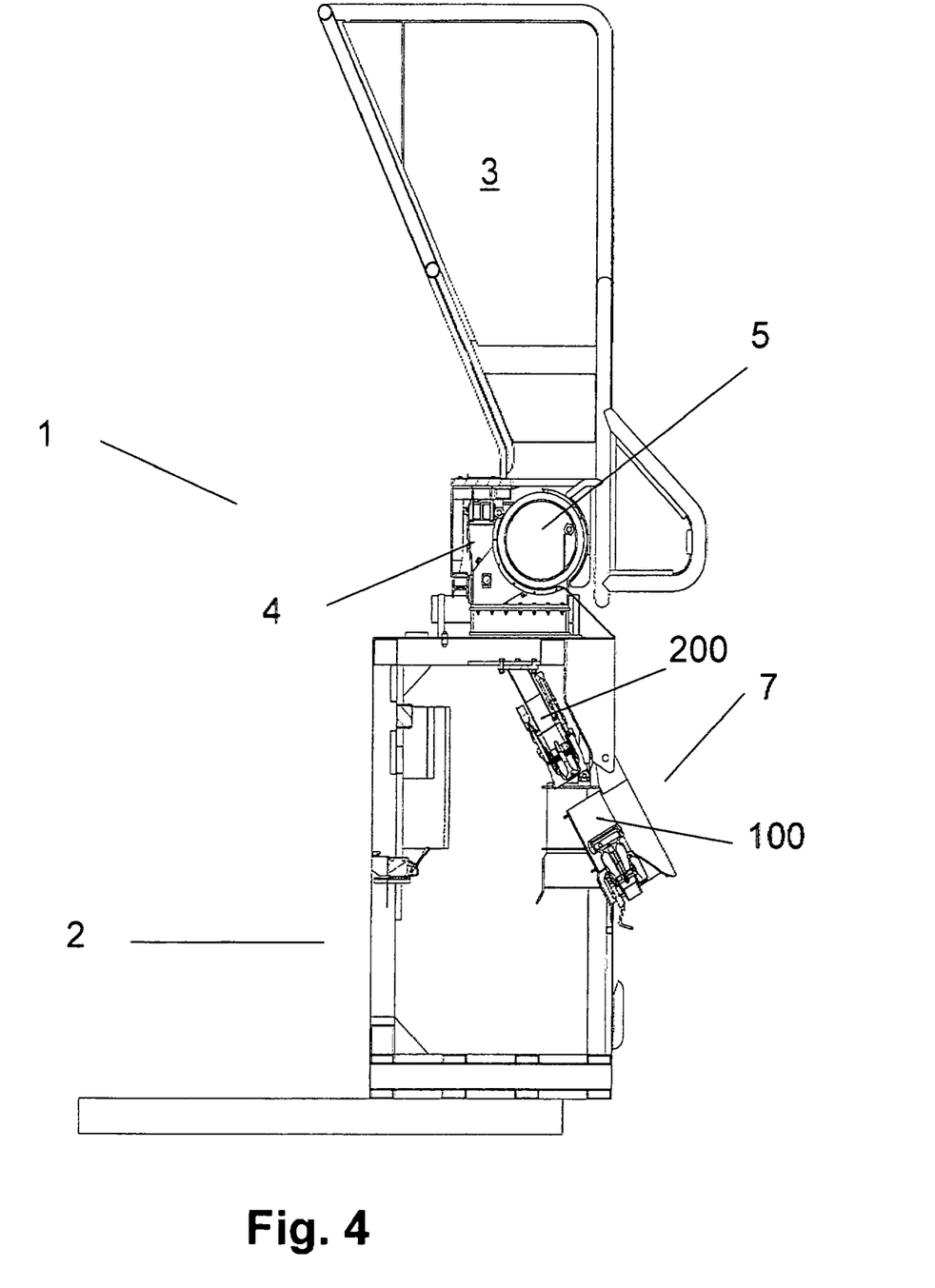
FIG. 4 is a cross section of cargo rail and a hose connection system.

The receiving hatch 7, see FIGS. 2 and 3, comprises a lower funnel shaped receiving part 9, guiding the female coupling part 100 into an inner tunnel 10 of the receiving hatch 7. FIG. 4 is a cross section through the cargo rail and the hose handling system where the female coupling part 100 is in the intermediate position illustrated in FIGS. 2 and 3. The female coupling part is thereafter pulled by the forerunner into contact and coupling with a male coupling part 200.

Figure 5:
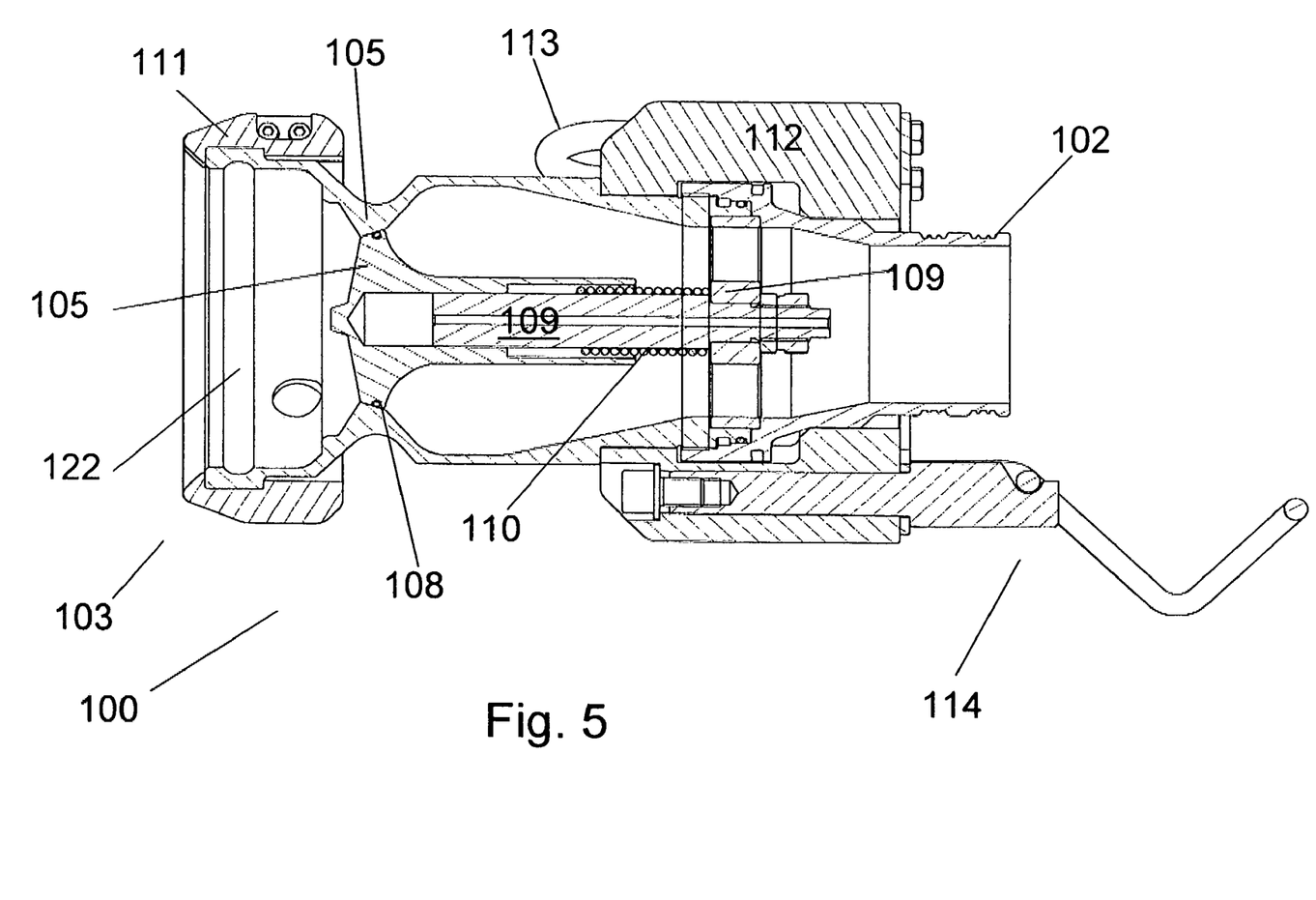
FIG. 5 is a longitudinal section of a female coupling part according to a preferred embodiment of to the invention.

FIG. 5 is a longitudinal section of a female coupling part 100. The female coupling part 100 comprises a hollow main body 101. The main body 101 is a substantially rotational symmetrical tubular member, having a connecting branch 102 for a not shown hose at one end, and a connection part 103 at the opposite end. The main body 101 may of practical reasons, such as e.g. production or maintenance, be divided into several parts that are closely connected to each other.

The female coupling part also comprises a check valve to avoid leakage of bulk from the hose through the female coupling part. Close to the connection part 103, the inner wall of the main body is conical with the cone's widest base towards the connecting branch. This conical part forms a valve seat 106 for a valve cone 105. An O-ring 108 seals the check valve. The valve cone 107 is slideably arranged on a valve bolt 109 that is running axially inside the female coupling part and is fastened to the inside of the coupling part by means of a connection ring 109. The valve cone 105 is forced against the valve seat by means of a helical spring 110, to keep the check calve closed.

Parts of the female coupling part are preferably covered by protective sleeves, 111, 112. In the illustrated embodiment, the connecting part 103 of the main body is covered by an anterior protective sleeve 111, and a posterior protective sleeve 112. The protective sleeves both serves as protection for the vulnerable parts of the coupling part during all operations of the hose, and as guiding help as the female coupling part is pulled into the receiving hatch 7. During the operations of the hose and coupling, the forerunner is connected to a loop 113, whereas a lifting arrangement 114 is connected to the wire from the crane, preferably via a soft sling.

Figure 6:
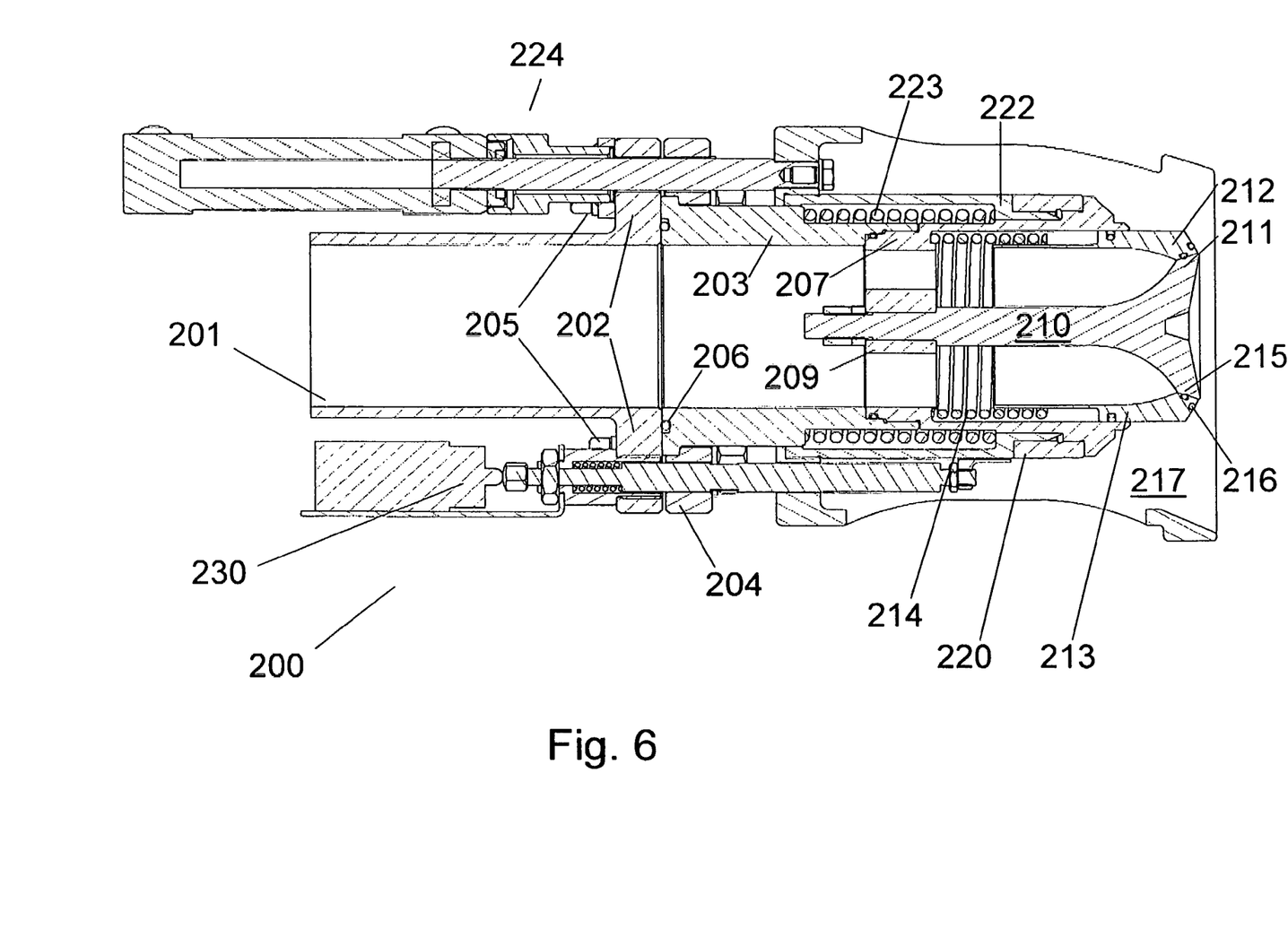
FIG. 6 is a longitudinal section of a male coupling part according to a preferred embodiment of the invention.

The male coupling part 200 is preferably permanently connected to a pipe system onboard the vessel and is preferably mounted in the cargo rail as illustrated in FIG. 4. The pipe system onboard the vessel is illustrated by a pipe 201 having a flange 202. The male coupling part comprises a mainly tubular base member 203 that is connected to the flange 202 by means of bolts 205 and a connection ring 204. An O-ring 206 is preferably provided between the flange and the base member to avoid leakage.

A mainly tubular support member 207 is fastened to the base member 203. The support member comprises or is fastened to a support 209 for a bolt 210 positioned mainly axially in the male coupling part, towards the opening thereof. At its outer end, the bolt is widened and forms a valve cone 211 having its largest diameter towards the outside of the coupling part. The valve cone 211 rests against a valve seat 212 formed a mainly tubular valve seat member 213 that is axially slideably arranged in the support member 207. A coil spring 214 forces the valve seat member 213 into close interaction with the valve cone 211. An O-ring 215 is preferably used to avoid leakage between the valve cone and the valve seat.

A protective guiding part 217 is preferably provided as illustrated both as a protection of the male coupling and as a guiding tool to guide an incoming female coupling part into the correct position relative to the male coupling part during the coupling of the device.

Figure 7:
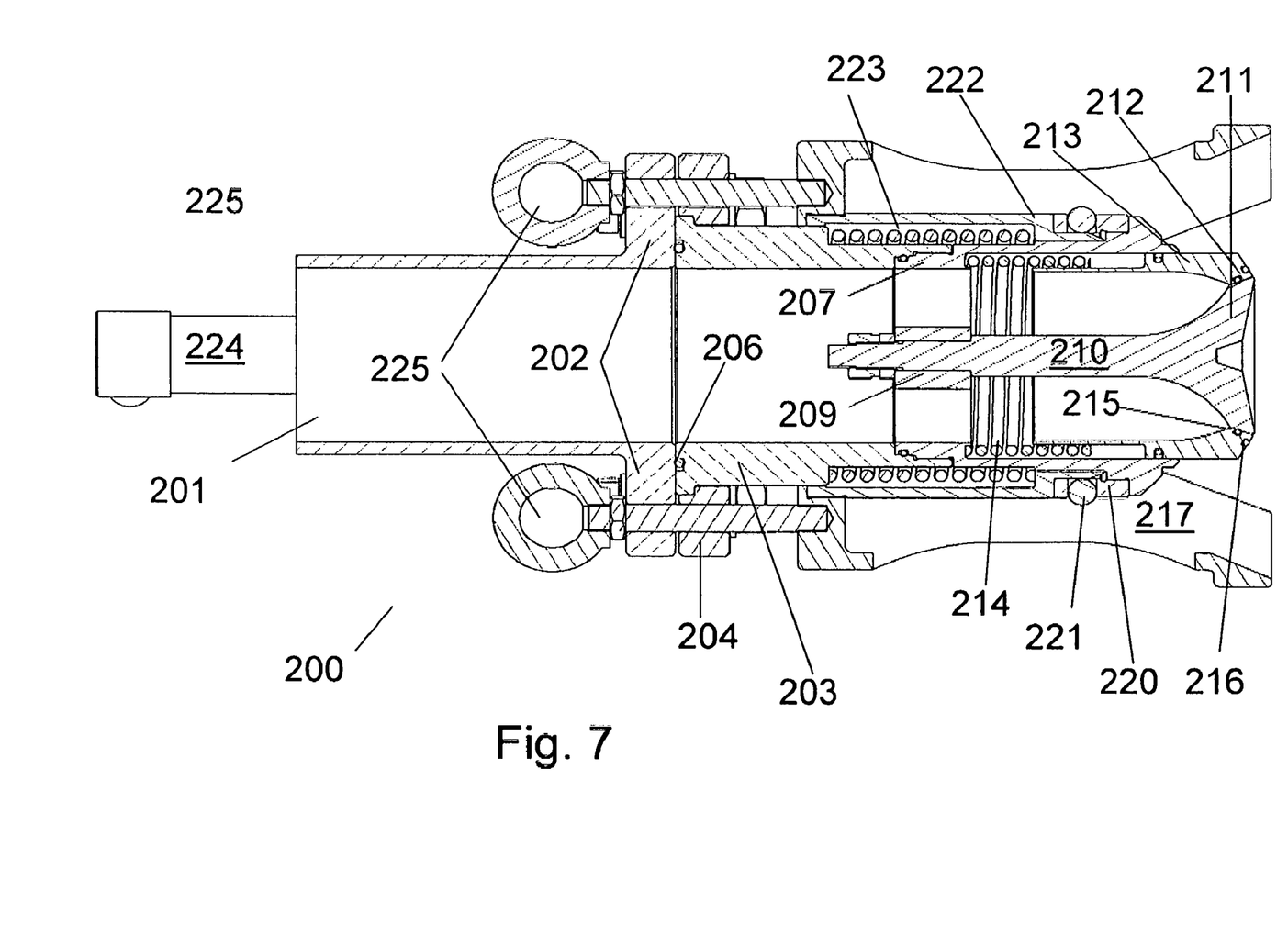
FIG. 7 is the longitudinal section through A-A in FIG. 6.

The male coupling part additionally comprises locking means to lock the male and female coupling parts together during operation. The illustrated locking means comprises a support ring 220 for locking balls 221, a locking ring 222, a helical locking spring 223 and an actuator 224. The locking ring 222 is slideably arranged on the male coupling part. In a first position the locking ring 222 forces the balls out from respective openings in the support ring 220, to be able to interact with a locking groove at the female coupling part. In a second position the locking ring is not interacting with the balls. The end of the locking ring facing the balls in the second position is beveled. The locking ring 222 is forced towards the first position by means of the helical locking spring 223. Accordingly, the normal position of the locking ring is said first position. The locking ring can be moved from said first position to said second position by means of the actuator 224, or manually by manually pulling the locking ring out of the first position by pulling in eye bolts 225, that are connected to the locking ring.

Additionally, indicator means 230 may be included in the male coupling part to allow remote monitoring of the coupling device.

Figure 8:
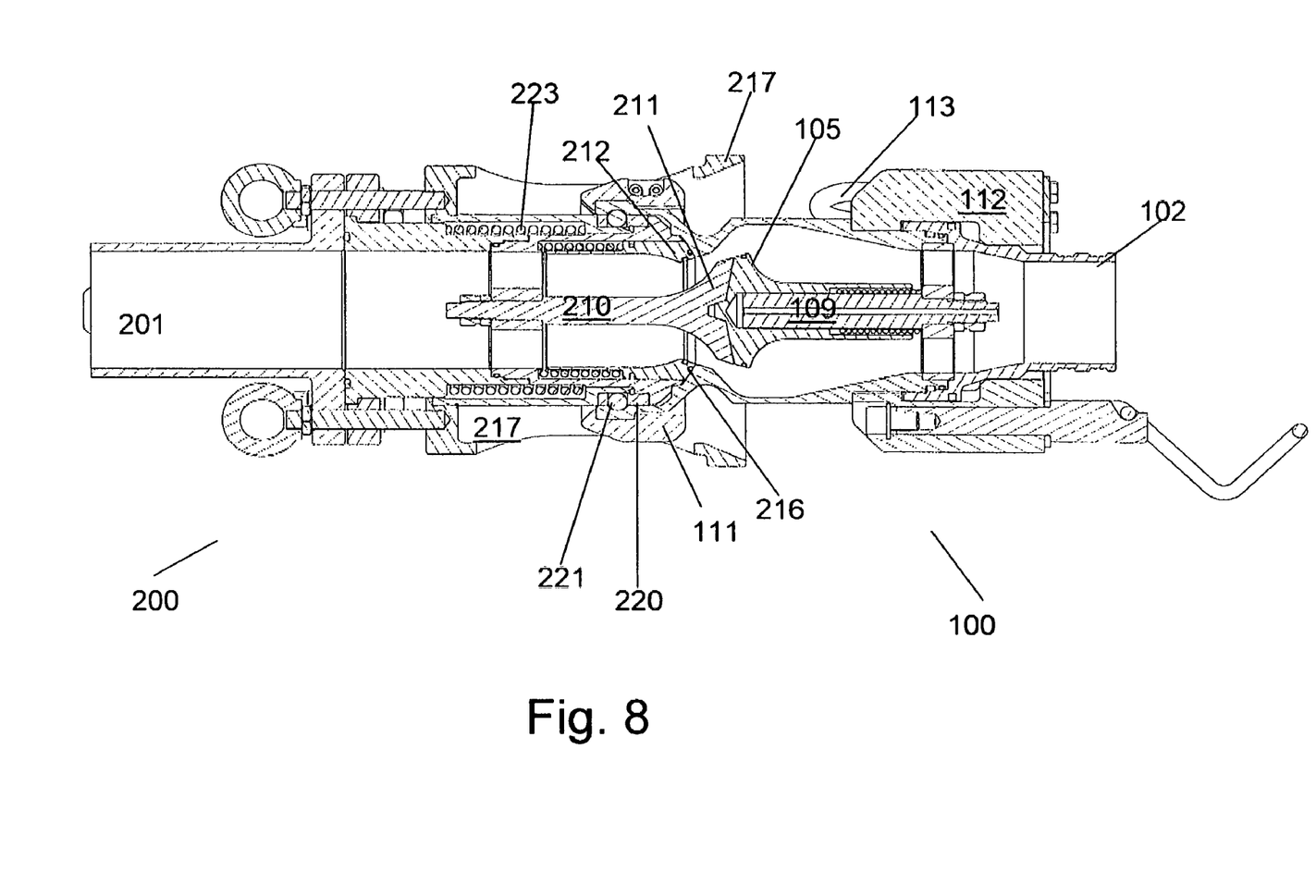
FIG. 8 is a longitudinal section of the male and female coupling parts of FIGS. 5 and 6 connected to each other.

In coupling the male and female parts, the parts are forced into interaction with each other as illustrated in FIG. 8. The protective and guiding parts 111, 217 helps to position the active parts of the coupling device. The front end of the valve seat member 213 is designed to interact and form a tight connection with a corresponding part of the connection part 103 of the female coupling part 100. An O-ring 216 is preferably provided to seal the connection. Thereafter the bolt 110 of the male part meets the valve cone 105 of the female part. By further forcing the male and female parts together, the check valve of the female coupling part is forced backwards so that the valve is opened. At the same time, the valve seat member 213 of the male coupling part is forced out of interaction with the valve cone 211 of the bolt 210, to open the valve of the male coupling part. When the male and female parts are coupled, the locking ring is released of the actuator, so that the locking balls 221 is forced out of the support ring 220 and into interaction with the groove 120 of the female connection part 103. In this position the bulk may flow through the connection device and the female and male coupling parts are locked to each other to avoid unintentional disconnection.

To stop the transfer operation and disconnect the coupling parts, the pumps pumping the bulk are stopped, the actuator pulls the locking ring 222 back to the second position, the male and the female coupling parts removed from each other. The action of the coil spring 214 will cause the valve seat member 213 be forced against the valve cone of the bolt 210, to close the valve of the male coupling part. At the same time, the bolt is pulled out of interaction with the valve cone 105 of the check valve of the female coupling part. Consequently, the valve cone 105 will be forced by the action of the coil spring 110 into closing interaction with the valve seat 106. After the valves of both the male and female coupling parts are closed, the valve seat member 213 of the male coupling part is pulled out of its tight connection with the connection part 103 of the female coupling part.

In case of an emergency, the male and female coupling parts may be released as described from a remote location without any need for manual work or without any risk of damage to personnel or equipment. Even if it is preferred to stop valves and/or reduce the pressure in the system before decoupling, the present coupling system may be decoupled under pressure without damaging the equipment or result in any extra spill of bulk.

In case of a "dead ship" i.e. in case of loss of electrical power and/or hydraulic pressure to operate the device, the present coupling device may be released manually by pulling the eye bolts 225 with a force greater than the force of the helical spring 223. The connection device will then be released as described above, without any spill of bulk or any danger to personnel or equipment.

The invention claimed is:

1. A hose connector comprising:
    a first coupling part, the first coupling part comprising:
        a first tubular body having a first end and a second end;
        a bolt within the first tubular body;
        a first valve cone slidably attached to the bolt;
        a first valve seat within the first tubular body, the first valve cone biased against the first valve seat; and
        a groove formed on an inner surface of the first tubular body between the first end and the first valve cone;
    a second coupling part, the second coupling part comprising:
        a second tubular body;
        a second valve cone;
        a second valve seat axially movable and biased against the second valve cone; and
        a support ring retaining locking balls on an outer surface of the second tubular body.

2. The hose connector of claim 1, wherein the second tubular body comprises a tubular support member and a base.

3. The hose connector of claim 1, further comprising a first spring biasing the first valve cone against the first valve seat and a second spring biasing the second valve seat against the second valve cone.

4. The hose connector of claim 1, further comprising a locking ring spring biased against the support ring.

5. The hose connector of claim 4, further comprising an actuator axially sliding the locking ring.

6. The hose connector of claim 1, further comprising
    a shoulder on the inner surface of the first tubular body, the shoulder engaging the second valve seat, the second valve cone engaging the first valve cone and the locking balls engaging the groove when the first coupling part is connected to the second coupling part.

7. The hose connector of claim 1, further comprising a guiding part connected to the second tubular body and spaced radially outwardly from the second valve seat.

8. The hose connector of claim 1, wherein the first valve cone is within the first tubular body and spaced from the first end of the first tubular body.

\* \* \* \* \*